United States Patent [19]

Johnson et al.

[11] Patent Number: 4,673,290

[45] Date of Patent: Jun. 16, 1987

[54] DIAGNOSTIC APPARATUS AND METHOD FOR USE IN THE ALIGNMENT OF ONE OR MORE LASER MEANS ONTO A FIBER OPTICS INTERFACE

[75] Inventors: Steve A. Johnson, Tracy, Calif.; Robert R. Shannon, Tucson, Ariz.

[73] Assignee: The United States of America as represented by the United States Department of Energy, Washington, D.C.

[21] Appl. No.: 692,747

[22] Filed: Jan. 18, 1985

[51] Int. Cl.$^4$ .............................................. G01B 11/27
[52] U.S. Cl. .................. 356/73.1; 350/171; 356/153
[58] Field of Search ............... 356/73.1, 153; 350/171, 350/276 R

[56] References Cited

U.S. PATENT DOCUMENTS

| | | | |
|---|---|---|---|
| 3,214,596 | 10/1965 | Schwerdt et al. | 350/276 R |
| 3,782,829 | 1/1974 | Herriott | 356/153 |
| 3,938,895 | 2/1976 | Bridger et al. | 356/73.1 |
| 4,197,007 | 4/1980 | Costa et al. | 356/73.1 |
| 4,220,411 | 9/1980 | Cowen | 356/73.1 |
| 4,260,254 | 4/1981 | Braun | 356/153 |
| 4,385,832 | 5/1983 | Doi et al. | 356/73.1 |

Primary Examiner—R. A. Rosenberger
Attorney, Agent, or Firm—P. Martin Simpson, Jr.; L. E. Carnahan; Judson R. Hightower

[57] ABSTRACT

Diagnostic apparatus for use in determining the proper alignment of a plurality of laser beams onto a fiber optics interface is disclosed. The apparatus includes a lens assembly which serves two functions, first to focus a plurality of laser beams onto the fiber optics interface, and secondly to reflect and image the interface using scattered light to a monitor means. The monitor means permits indirect observation of the alignment or focusing of the laser beams onto the fiber optics interface.

11 Claims, 4 Drawing Figures

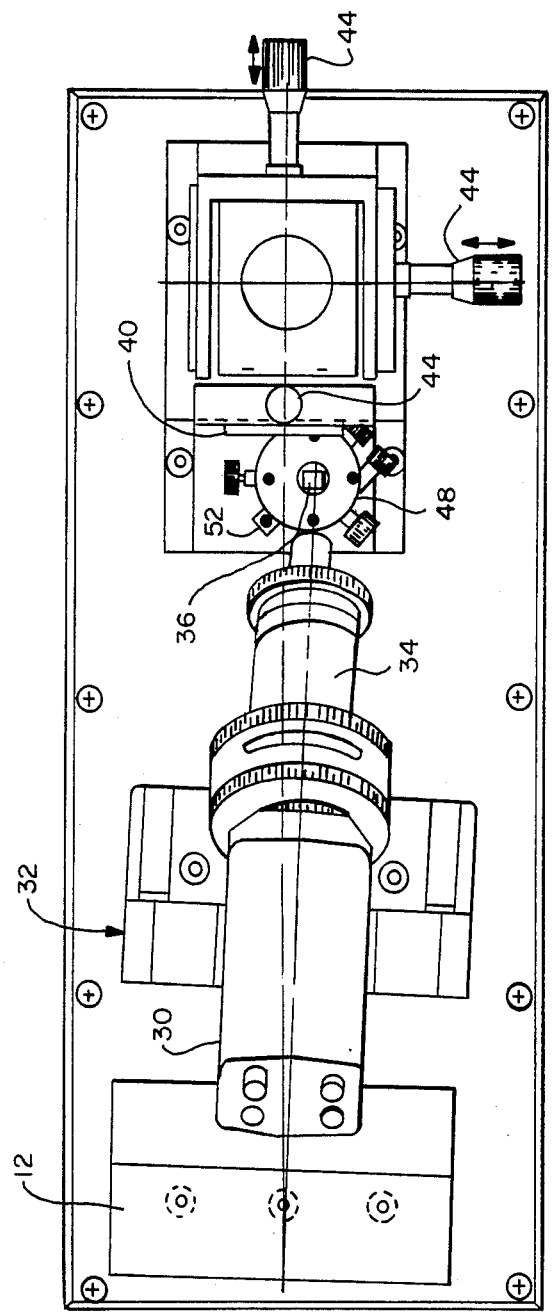
FIG.—2

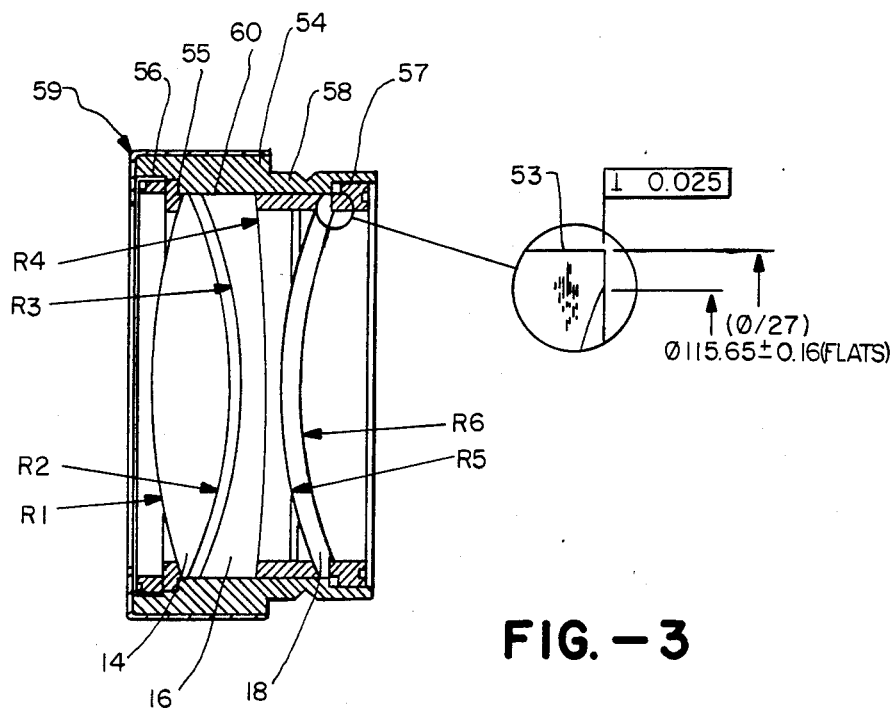
FIG.—3
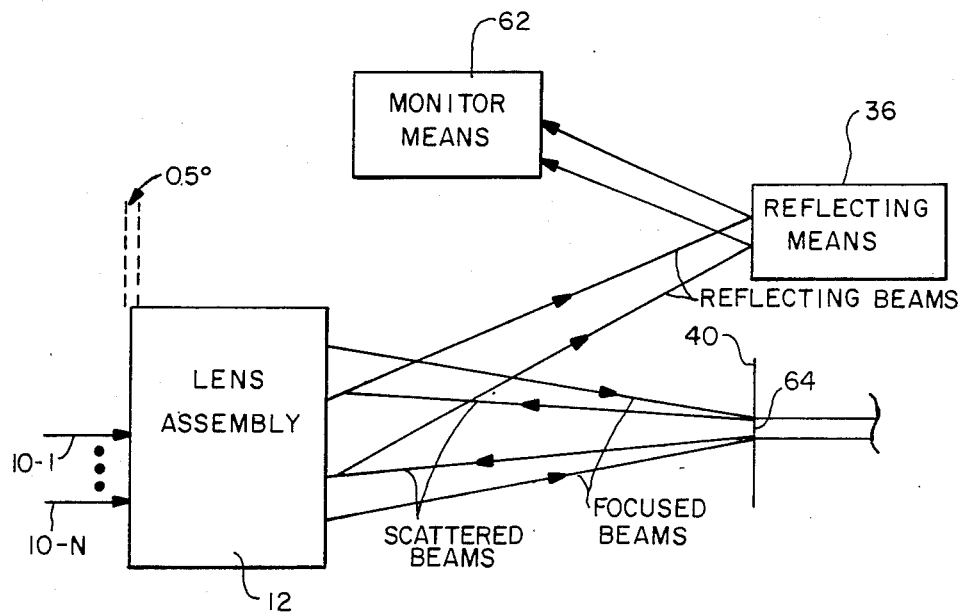
FIG.—4

DIAGNOSTIC APPARATUS AND METHOD FOR USE IN THE ALIGNMENT OF ONE OR MORE LASER MEANS ONTO A FIBER OPTICS INTERFACE

The United States Government has rights in this invention pursuant to Contract No. W-7405-ENG-48 between the United States Department of Energy and the University of California for operation of the Lawrence Livermore National Laboratory.

BACKGROUND OF THE INVENTION

The present invention relates to diagnostic apparatus and method for use in determining the proper alignment of one or more laser beams onto a fiber optics interface.

In the prior art, imaging systems are known which focus one or more laser beams onto a fiber optics interface which may have diameters of 500–1000 microns, or even less. If the focused or imaged laser beams are not properly aligned or focused onto the fiber optics interface, a resulting problem is that the tip of the fiber optics interface can be burned. The fiber optics interface in some cases includes the use of plastic clad fibers which are susceptible to burning due to laser energy being absorbed into the plastic material if the laser beam is misaligned. For high energy applications, glass clad fibers are typically used which are more resistant to laser damage problems. However, improper alignment will result in an energy loss due to some light which will never enter into the fiber. It is therefore important that the focused laser beams be aligned properly with the fiber optics interface.

Typical approaches to determining proper alignment of laser beams onto a fiber are to observe the alignment from the side or to insert a beam splitting device in front of the fiber to allow an image of the fiber face to be directed onto a camera. A problem with monitoring from the side of the interface is that the observation is blurred and does not form a good quality image due to the tilted object (with reference to the camera). A problem with using a beam splitting device is that energy is wasted which reflects off the front face of the beam splitter.

SUMMARY OF THE INVENTION

It is an object of the present invention to provide an improved diagnostic apparatus and method for use in determining the proper alignment of one or more laser beams onto a fiber optics interface.

It is another object to provide diagnostic apparatus which allows proper monitoring of the alignment of a plurality of laser beams onto a fiber optics interface through indirect observation that is essentially equivalent to direct observation of the fiber optics interface itself.

Briefly, the invention includes a lens assembly for imaging an aperture through which one or more laser beams pass onto a fiber optics interface. The lens assembly is slightly offset in an optical orientation from its center line optical axis. As the laser beams are focused onto the fiber optics interface by the lens assembly, scattered light from the interface is reflected by the back side of the lens assembly to a monitor means. The monitor means are optically oriented to permit monitoring of the scattered reflected laser light thereby permitting an indirect observation to determine the proper alignment of the imaged beam aperture onto the fiber optics interface.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of this specification, illustrate an embodiment of the invention and, together with the description, serve to explain the principles of the invention.

FIG. 2 depicts a top view of the diagnostic apparatus of FIG. 1.

FIG. 3 depicts a more detailed view of the lens assembly which forms a part of FIG. 1.

FIG. 4 depicts a diagramic illustration of the indirect observational capabilities of the present invention.

DETAILED DESCRIPTION OF THE INVENTION

Figure 1:
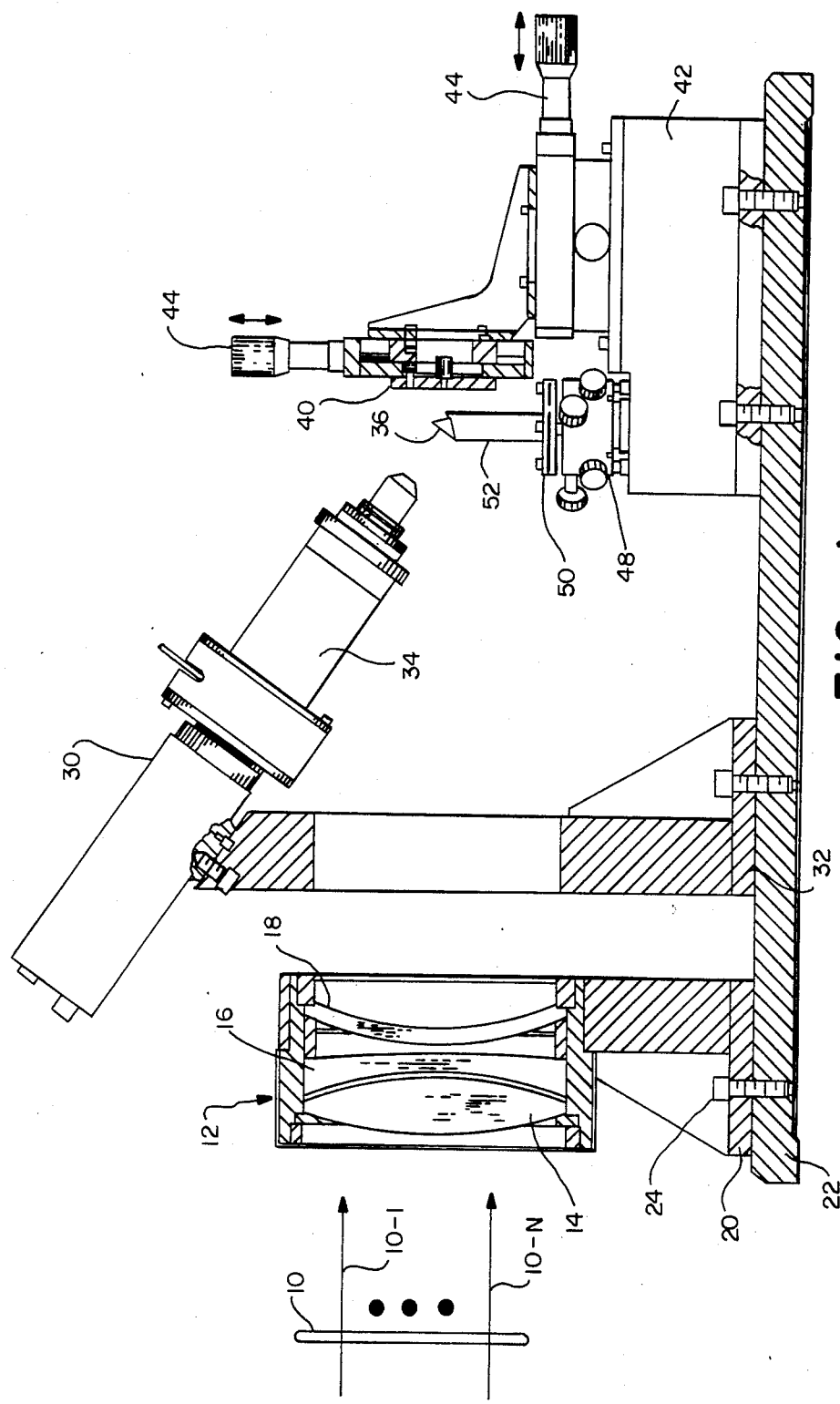
FIG. 1 depicts a side, partially cross-sectional view of the diagnostic apparatus according to the present invention.

Reference will now be made in detail to a preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Referring now to FIG. 1, a side, partially cross-sectional view of the diagnostic apparatus according to the present invention is depicted.

In FIG. 1, a plurality of laser beams 10 (10-1, . . . 10-N) are input to a lens assembly 12, which includes lenses 14, 16 and 18. Lens assembly 12 is supported by a lens cell pedestal 20 which in turn is fixedly connected to a surface plate 22 by means of screw 24.

In one embodiment, lens assembly 12 is optically oriented or "tilted" from the optical centerline axis of the laser beams 10 by approximately 0.5 degrees for reasons which will become apparent.

In FIG. 1, a monitoring means includes a television camera 30 supported by a TV camera pedestal 32. TV camera 30 in turn is optically connected to a microscope objective 34, which in turn is focused on reflecting means 36, which could be a prism or mirror.

In FIG. 1, a fiber optics connector 40 receives the focused laser beams from lens assembly 12. Fiber optics connector 40 is positioned by means of a support housing 42 and in addition fiber optics connector 40 can be translated or moved to an appropriate position by means of translation stages 44. It will be assumed for purposes of discussion that fiber optics connector 40 can be accurately positioned through conventional means, as it is not the scope of the invention to cover that particular aspect.

In FIG. 1, housing 42 also provides support for a reflecting mirror or prism table 48 which in turn supports pedestal flange 50 and mirror or prism pedestal 52. Prism 36 is supported by prism pedestal 52.

Referring now to FIG. 2, a top view of the diagnostic apparatus of FIG. 1 is depicted. In FIG. 2, it can be seen that the lens assembly 12 will appropriately focus one or more laser beams to the fiber connector 40. The lens assembly is optically positioned (e.g., "tilted") to have an offset of approximately 0.5 degrees from its optical center line. When the focused laser beams are forming an image of the aperture on the fiber optic interface 40, there will be a minor scattering of laser beams back to lens assembly 12.

Referring again to FIG. 1, the scattered beams from fiber optic connector 40 are scattered to the back side of lens 18, which forms a portion of lens assembly 12.

The scattered beams from fiber optic connector 40 are reflected due to the 0.5 degree angle by the back side of mirror 18 to reflecting means 36, which could be a prism or a reflecting mirror. Reflecting means 36 in turn reflects the scattered reflected beams to microscope objective 34 which expands the image for suitable monitoring by TV camera 30.

Referring now to FIG. 3, a preferred embodiment of the specific lens assembly 12 of FIG. 1 is depicted in more detail. In FIG. 3, the lenses numbered 14, 16 and 18 correspond to the same numbers illustrated in FIG. 1. The lens assembly includes a lens cell 54, lens seat 55, and lens set nuts 56, 57. Also, lens assembly 12 includes a lens separator 58, lens cap 59 and lens separator 60.

The purpose of lens assembly 12 in FIG. 3 is to focus a plurality of laser beams to a fiber optic interface. In one embodiment, the interface has a diameter of approximately 500 microns. However, as has been previously described, the imaging or focusing of a plurality of laser beams onto a fiber optic interface can damage the fiber optic material if the imaging is in fact not properly or accurately done.

In FIG. 3, the radii of curvature of the respective lens assemblies are identified as R1, R2 for lens 14, radii R3, R4 for lens 16, and radii R5, R6 for lens 18. The surfaces R1–R5 of lens assembly 12 are coated with a multi-layer dielectric AR (anti-reflecting) coating, while surface R6 is uncoated. Optical coatings and uncoating techniques are well known to those of ordinary skill in the art. The specifications for the lens assembly including the lens diameter and radii of curvature for the respective lenses are illustrated in Chart I below:

CHART I

| Lens Dia. | Radius of Curvature | |
|---|---|---|
| 14 127 mm | R1 = 281.39 ± 1.4 | R2 = 183.81 ± 0.18 |
| 16 127 mm | R3 = −183.81 ± 0.18 | R4 = −704.14 ± 3.5 |
| 18 127 mm | R5 = 183.81 ± 0.9 | R6 = 294.25 ± 1.45 |

| Lens Dia. | Center Thickness | Separation (Air) |
|---|---|---|
| 14 127 mm | 25 ± 0.1 | |
| 16 127 mm | 10 ± 0.1 | 5 ± 0.1 |
| 18 127 mm | 12 ± 0.1 | |

| Lens Dia. | Glass Type | | |
|---|---|---|---|
| 14 127 mm | Schott BK7. | Nd = 1.517 | Vd = 64.1 |
| 16 127 mm | Schott SF2. | Dd = 1.647 | Vd = 33.8 |
| 18 127 mm | Schott BK7. | Nd = 1.517 | Vd = 64.1 |

The F number for the lens assembly of FIG. 3 is 3.1, and the magnification is 1/40. The image distance is 298 mm and the distance from the aperture to lens 14 is 13142.5 mm. The aperture is 20 mm and the fiber optic diameter is 500 microns. The separation in Chart I above is the separation between lenses 16 and 18, as illustrated in FIG. 3.

Given the parameters identified above, the lens assembly illustrated in FIG. 3 could be constructed by one of ordinary skill in the art, using suitable computer design codes such as CODE 5 (Optical Research Associates located in Santa Barbara, CA); OSLO (Sinclair Optics); or ACCOSS (Scientific Instruments). With such codes, one can model suitable optical assemblies to determine the performance and specifications.

Referring now to FIG. 4, a diagramic illustration of the propagation of the laser beams according to the present invention is depicted. In FIG. 4, laser beams 10 are focused to fiber optic connector 40. Sone of the light focused onto the fiber face 64 of fiber optic connector 40 is naturally scattered off the fiber optic cable 12, even if properly aligned. As illustrated in FIG. 4, the scattered light is received by lens assembly 12, specifically by the back side of lens 18. The back surface, due to the slight tilt of the lens assembly, is used to reflect and image the scattered light to reflection means 36, which in turn directs the reflected image information to monitor means 62.

Lens assembly 12 thus performs a dual function of focusing the input laser beams onto the fiber optic interface and in addition acts as a mirror for the scattered laser light which is scattered from the fiber optic interface. This is achieved because the back side of lens assembly 18 is uncoated (bare glass). However, because monitor 62 need only sense a very low light level, it is unnecessary for any large requirement of scattered light in terms of power. It can be seen that the present invention provides a diagnostic observation capability in an indirect fashion.

The assembly is unique because in the transmitting direction it images the aperture through which the beams pass to the same point in space at which the image of the fiber is placed while using the scattered light and the back reflective face of the assembly. Because of this property, the assembly acts as a self testing gauge lens. It is not necessary to provide monitoring equipment to directly view the fiber optic interface. Rather, through indirect observation techniques, by utilizing a dual function lens assembly and the reflecting prism, the monitoring of the reflected scattered light provides an almost equivalent of the direct observation of the fiber optic interface.

In FIG. 4, once an observer using monitor means 62 determines that the alignment is correct (or not), adjustments can be made in a straightforward and conventional fashion.

Consequently, it can be seen that the present invention provides a diagnostic alignment capability which is not impeding the overall aspects of the laser beam propagation or sacrificing laser power by including beam splitters or other components into the beam.

The foregoing description of a preferred embodiment of the invention has been presented for purposes of illustration and description. It is not intended to be exhaustive or to limit the invention to the precise form disclosed, and obviously many modifications and variations are possible in light of the above teaching.

The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Diagnostic apparatus for use in the alignment of one or more beams onto a fiber optics interface, said diagnostic apparatus comprising monitor means, lens assembly means for imaging one or more of said laser beams passing through an aperture onto said fiber optics interface, said assembly means being slightly offset in an optical orientation from its center line optical axis, said lens assembly means including at least one lens where said one lens includes reflection means on the rear surface of said one lens such that when a minor scattering of said laser beams are reflected from said interface back to said lens assembly means, said reflection means on said one lens reflects, images and directs said scattered light toward said monitor means, said monitor means being optically oriented to permit monitoring of said reflected light for indirect observation of the alignment of said focused laser beams onto said fiber optics interface.

2. The diagnostic apparatus of claim 1 wherein said offset of said lens assembly means from said center line optical axis is approximately 0.5 degrees.

3. The diagnostic apparatus of claim 2 wherein said monitor means include means for reflecting said scattered reflected beams.

4. The diagnostic apparatus of claim 3 wherein said reflecting means include a prism.

5. The diagnostic apparatus of claim 4 wherein said monitor means include a microscope objective to permit imaging of said reflected beams from said prism.

6. The diagnostic apparatus of claim 5 wherein said monitor means include means to permit observation of said imaged reflected light.

7. The diagnostic apparatus of claim 6 wherein said observation means includes a television camera.

8. The diagnostic apparatus of claim 4 wherein the back side of said lens assembly means is uncoated to permit reflection of said scattered beams toward said prism.

9. The diagnostic apnaratus of claim 3 wherein said reflecting means include a reflecting mirror.

10. Diagnostic apparatus for use in the alignment of one or more laser beams onto a fiber optics interface, said diagnostic apparatus comprising monitor means, lens assembly means for focusing one or more of said laser beams onto said fiber optics interface, said lens assembly menas being slightly offset in an optical orientation from its center line optical axis, said lens assembly means including at least one lens where said one lens includes reflection means on the rear surface of said one lens such that when a minor scattering of said laser beams are reflected from said interface back to said lens assebmly means, said one lens includes means for reflecting scattered ones of said laser beams for said fiber optics interface toward said monitor means, said monitor means being optically oriented to permit monitoring of said scattered, reflected laser beams for indirect observation of the alignment of said focused laser beams onto said fiber optics interface.

11. In a method for use in an optical alignment system including diagnostic apparatus for use in the alignemtn of one or more laser beams onto a fiber optics interface, the method comprising the steps of providing a monitor means and a lens assembly means where said lens assembly means includes at least one lens where said one lens includes reflection means on the rear surface of said one lens, focusing one or more of said laser beams onto the fiber optics interface, orienting said lens assembly means in a slightly offset position from its center line optical axis such that when minor scattering of said laser beams are reflected from said interface back to said lens assembly means, such that said rear surface of said one lens operates to reflect scattered one or more of said laser beams from said fiber optics interface toward said monitor means, and optically orienting said monitor means to permit monitoring of said scattered, reflected laser light for indirect observation of the alignment of said focused laser beams onto said fiber optics interface.

* * * * *